United States Patent [19]

Hervin

[11] Patent Number: 5,524,222
[45] Date of Patent: Jun. 4, 1996

[54] MICROSEQUENCER ALLOWING A SEQUENCE OF CONDITIONAL JUMPS WITHOUT REQUIRING THE INSERTION OF NOP OR OTHER INSTRUCTIONS

[75] Inventor: Mark W. Hervin, Dallas, Tex.

[73] Assignee: Cyrix Corporation, Richardson, Tex.

[21] Appl. No.: 343,277

[22] Filed: Nov. 22, 1994

Related U.S. Application Data

[63] Continuation of Ser. No. 859,084, Mar. 27, 1992, abandoned.

[51] Int. Cl.[6] .................................................. G06F 15/00
[52] U.S. Cl. ...................... 395/375; 395/800; 364/265.1; 364/262.7; 364/DIG. 1
[58] Field of Search .................................. 395/800, 375; 364/261.5, 262.7, DIG. 1

[56] References Cited

U.S. PATENT DOCUMENTS

| | | | |
|---|---|---|---|
| 4,674,063 | 6/1987 | Sato | 395/375 |
| 4,701,842 | 10/1987 | Olnowich | 395/375 |
| 4,773,002 | 9/1988 | Iwasaki et al. | 395/375 |

*Primary Examiner*—Alyssa H. Bowler
*Assistant Examiner*—John Harrity
*Attorney, Agent, or Firm*—Andrew S. Viger; John L. Maxin

[57] ABSTRACT

A sequencer for use in a pipeline architecture includes circuitry for determining whether the previous instruction was a conditional jump instruction and whether the condition was met, circuitry for determining whether the current instruction is a conditional jump, and circuitry inhibiting a branch responsive to the current instruction, if the previous instruction was a conditional jump and the condition was met. Additionally, circuitry may be provided for treating a CALL instruction as a one-cycle unconditional jump if the preceding instruction was a conditional jump and the condition was not met, thereby implementing a two-cycle IF-THEN-ELSE instruction.

7 Claims, 4 Drawing Sheets

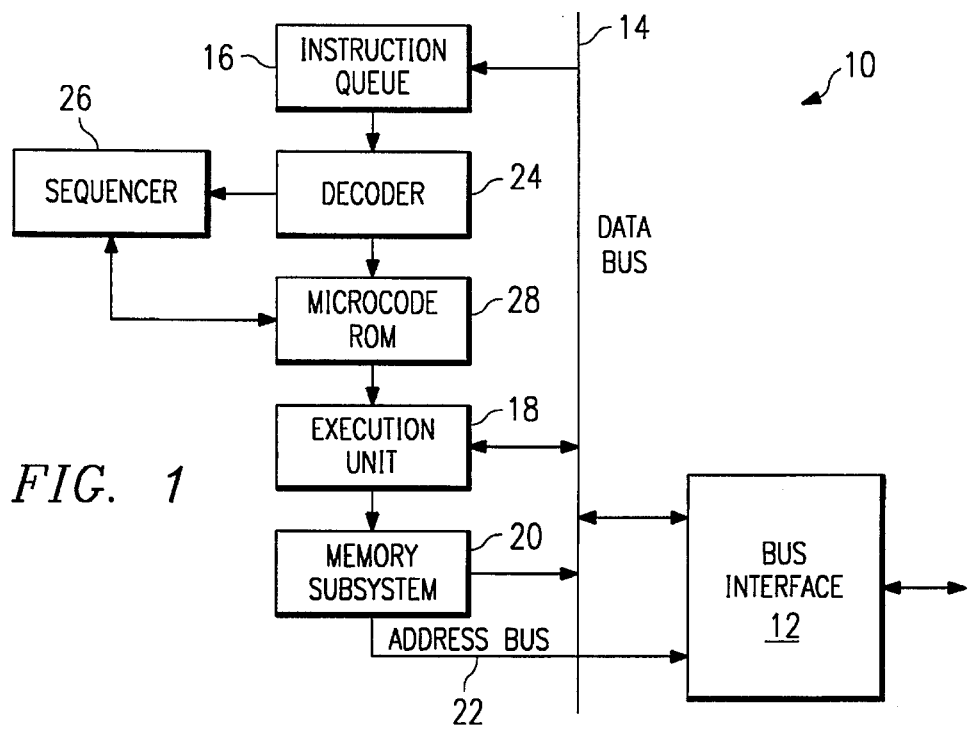
FIG. 1
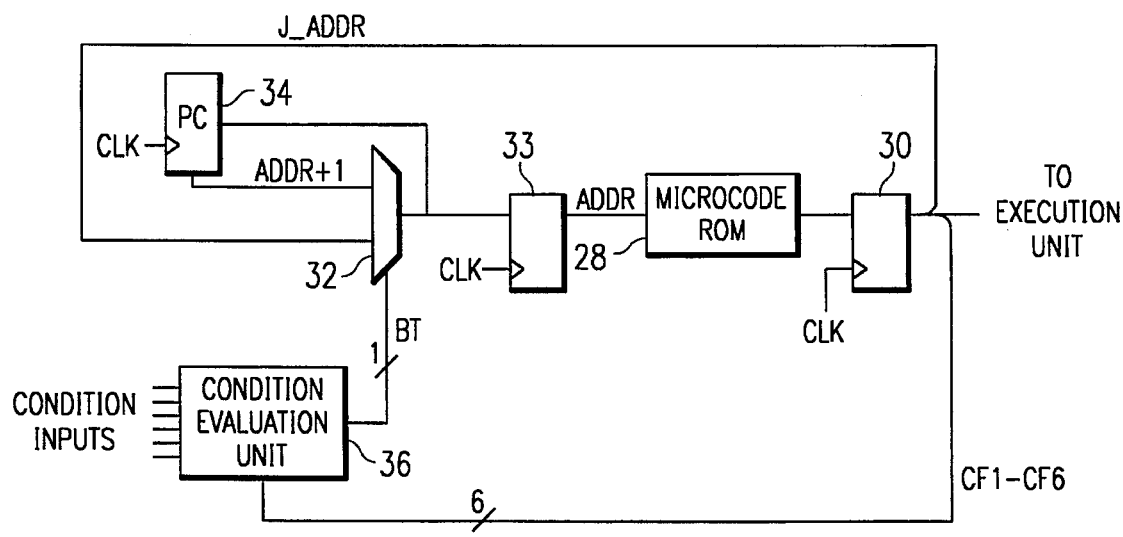
FIG. 2a
FIG. 2b
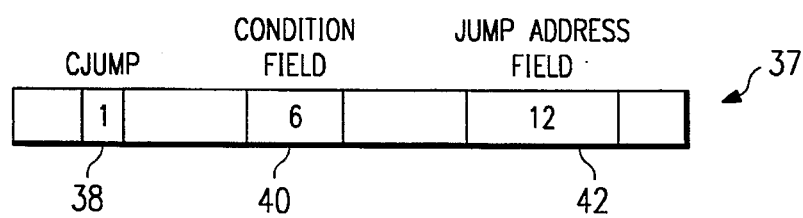

FIG. 2c

| | |
|---|---|
| N | CJUMP a A |
| N+1 | DEAD BOX |
| N+2 | CJUMP b B |
| N+3 | DEAD BOX |
| N+4 | CJUMP c C |
| N+5 | DEAD BOX |
| | ⋮ |
| A | |
| A+1 | |
| A+2 | |
| | ⋮ |
| B | |
| B+1 | |
| B+2 | |
| | ⋮ |
| C | |
| C+1 | |
| C+2 | |

FIG. 3a

| | |
|---|---|
| N | CJUMP a A |
| N+1 | CJUMP b B |
| N+2 | CJUMP c C |
| | ⋮ |
| A | |
| A+1 | |
| A+2 | |
| | ⋮ |
| B | |
| B+1 | |
| B+2 | |
| | ⋮ |
| C | |
| C+1 | |
| C+2 | |

FIG. 3b

| CONDITIONS | | | INSTRUCTION SEQUENCE | | | | | |
|---|---|---|---|---|---|---|---|---|
| c | b | a | t | t+1 | t+2 | t+3 | t+4 | t+5 |
| 0 | 0 | 0 | N | N+1 | N+2 | N+3 | N+4 | N+5 |
| 0 | 0 | 1 | N | N+1 | A | A+1 | A+2 | A+3 |
| 0 | 1 | 0 | N | N+1 | N+2 | B | B+1 | B+2 |
| 0 | 1 | 1 | N | N+1 | A | B | B+1 | B+2 |
| 1 | 0 | 0 | N | N+1 | N+2 | N+3 | C | C+1 |
| 1 | 0 | 1 | N | N+1 | A | A+1 | A+2 | A+3 |
| 1 | 1 | 0 | N | N+1 | N+2 | B | C | C+1 |
| 1 | 1 | 1 | N | N+1 | A | B | C | C+1 |

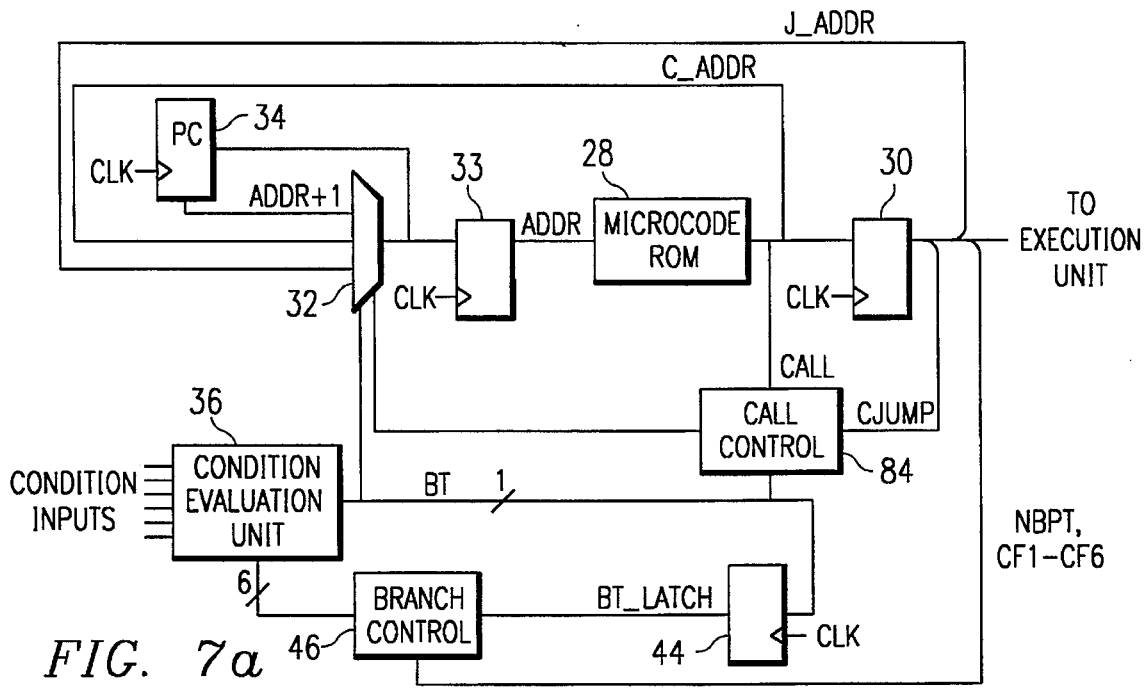
FIG. 7a
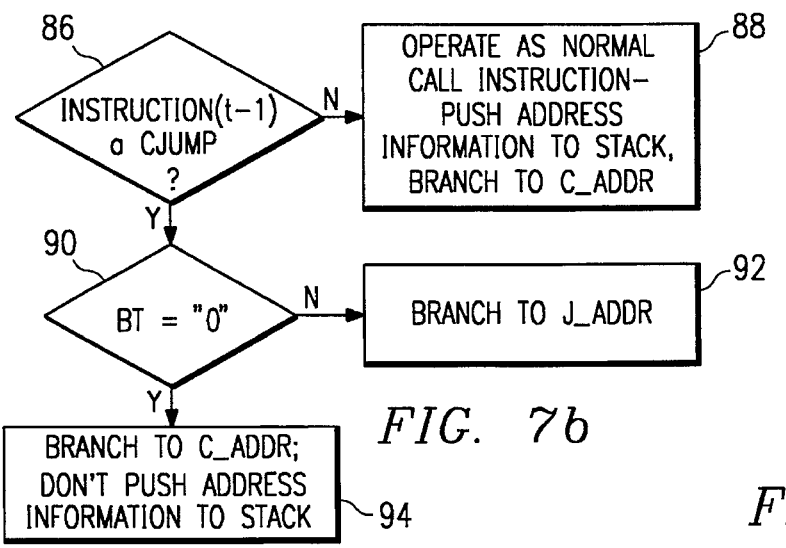
FIG. 7b
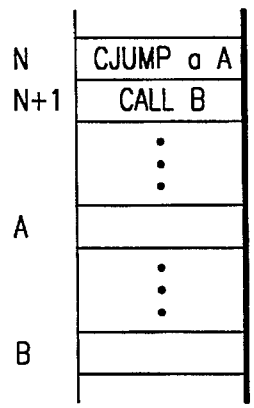
FIG. 7c
FIG. 7d
| a | SEQUENCE | | |
|---|---|---|---|
|   | t | t+1 | t+2 |
| 0 | N | N+1 | B |
| 1 | N | N+1 | A |

5,524,222

MICROSEQUENCER ALLOWING A SEQUENCE OF CONDITIONAL JUMPS WITHOUT REQUIRING THE INSERTION OF NOP OR OTHER INSTRUCTIONS

The present application is a file wrapper continuation of application Ser. No. 07/859,084, filed, Mar. 27, 1992 now abandoned.

TECHNICAL FIELD OF THE INVENTION

This invention relates in general to integrated circuits, and more particularly for a sequencer for use in a microprocessor.

BACKGROUND OF THE INVENTION

In order to enhance the operation of the microprocessor, a pipelined architecture may be used. In a pipelined architecture, the output of the microcode ROM is stored in a latch. Hence, the output of the latch is one instruction cycle behind the output of the microcode ROM. While pipelining has significant advantages to the overall operation of the circuit, one detriment of pipelining is its effect on conditional jump instructions. In a conditional jump instruction, a jump to a specified address is contingent upon whether a specified condition is met. In a pipelined architecture, the next instruction will be output from the microcode ROM as the condition is being evaluated.

Consequently, after a conditional jump instruction, the next sequential instruction in the microcode ROM will be executed, whether or not the condition is met. The next instruction after a conditional jump instruction is known as the "deadbox". In some instances, the microcode programmer may be able to make use of the deadbox. Most often, however, a NOP instruction is placed in the deadbox.

In microcode programming, it is often desirable to check a number of conditions. Ideally, a series of conditional jumps would be placed one after the other in the microcode ROM. However, because of the pipelined architecture, the ramifications of a series of conditional jumps is often very complex. The alternative would be to place NOPs in the deadboxes, thereby having a conditional jump every other memory location. This technique, however, is very slow.

Therefore, a need has arisen in the industry to provide a sequencing architecture which enhances the performance of a series of conditional jumps.

SUMMARY OF THE INVENTION

In accordance with the present invention, a sequencing method and apparatus is provided which substantially eliminates problems and disadvantages associated with pipelined sequencing architectures in conjunction with conditional jump commands.

The microcode subsystem of the present invention comprises a memory for outputting instructions responsive to an address input, circuitry for determining whether the previous instruction was a conditional jump instruction and whether the condition was met, circuitry for determining whether the current instruction is a conditional jump, and circuitry for inhibiting a branch responsive to the current instruction if the previous instruction was a conditional jump and the condition was met.

The present invention provides significant advantages, since the microcode programmer can provide for conditional jumps which will branch only when the previous instruction did not branch. Thus, a series of sequential conditional jumps may be implemented, thereby significantly increasing the operational speed of the processor.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 illustrates a block diagram of a microprocessor;

FIG. 2a illustrates a block diagram of a sequencing circuit;

FIG. 2b illustrates a micro-instruction word, showing conditional jump fields;

FIG. 2c illustrates a sequence of instructions using the "deadbox" technique;

FIG. 3a illustrates an instruction sequence using consecutive conditional jump instructions;

FIG. 3b illustrates a chart of the instruction sequence responsive to whether the various conditions in FIG. 3a are met;

FIG. 5 illustrates a schematic representation of the branch cobol circuit of FIG. 4a;

FIG. 7a illustrates a sequencer for implementing a two-cycle IF-THEN-ELSE instruction;

FIG. 7b illustrates a flow chart showing the operation of the call control circuit of FIG. 7a;

FIG. 7C illustrates a sequence of instructions for an IF-THEN-ELSE instruction; and FIG. 7d illustrates a chart showing the instruction sequence responsive to different values of the condition in the IF-THEN-ELSE instruction.

DETAILED DESCRIPTION OF THE INVENTION

Figure 4A:
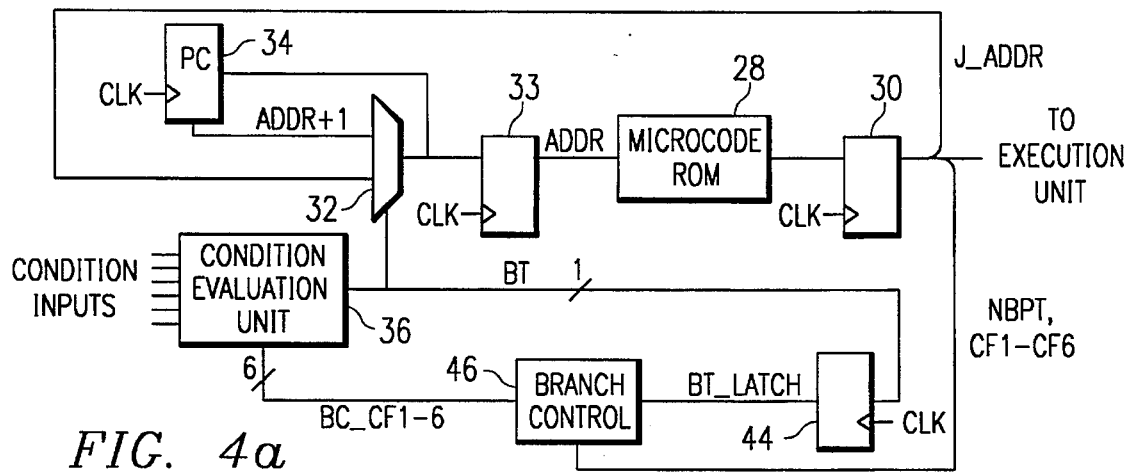
FIG. 4a illustrates a block diagram of a sequencer using branch control to perform consecutive conditional jump instructions.

The preferred embodiment of the present invention and its advantages are best understood by referring to FIGS. 1–7 of the drawings, like numerals being used for like and corresponding parts of the various drawings.

FIG. 1 illustrates a block diagram of a microprocessor 10. The microprocessor 10 communicates with I/O pins through bus interface 12. Bus interface 12 is coupled to a data bus 14, which is also coupled to instruction queue 16, execution unit 18 and memory subsystem 20. Memory subsystem 20 is also coupled to bus interface 12 through an address bus 22. Instruction queue 16 is coupled to decoder 24, which is coupled to sequencer 26 and microcode ROM 28.

In operation, instructions to the microprocessor are received through bus interface 12 and stored in instruction queue 16. Instructions from the queue 16 are input to the decoder 24. Instructions output from the decoder 24 are executed by related instructions stored in the microcode ROM 28. Each instruction may correspond to many microcode instructions. The output of microcode ROM 28 controls the execution unit 18. The sequence of microcode instructions output from microcode ROM 28 is controlled by the sequencer 26.

FIG. 2a illustrates a block diagram of a general architecture sequencer 26 and microcode ROM 28 in a pipelined architecture. The output of microcode ROM 28 is stored in latch 30. An address is input to microcode ROM 28 through address multiplexer 32 and clocked latch 33. The multiplexer 32 has as its inputs the JUMP ADDRESS field from the microcode instructions stored in latch 30 (see FIG. 2b) and the output of a program counter 34. The program counter outputs a value equal to the current output of the address multiplexer 32 incremented by one. Typically, the multiplexer 32 will have other inputs, such as a reset address and an address generated by the exception processor; however, for ease of illustration, these inputs will not be shown or described herein. The select port of multiplexer 32 is controlled by the output (BT) of a condition evaluation unit 36 (if other inputs to the address multiplexer 32 where present, each input would have a respective control input). The output of the condition evaluation unit 36 is controlled by the condition field 40 from the instruction word output from latch 30 (see FIG. 2b).

FIG. 2b illustrates selected fields of an instruction word 37, as would be output from microcode ROM. A typical microcode instruction word comprises approximately 150 bits. In connection with the present invention, an instruction word will typically contain a 1-bit field 38 indicating whether the instruction is a conditional jump (CJUMP), a 6-bit condition field 40 indicating the condition to be met for the branch to occur, and a jump address field 42 indicating the address in the microcode ROM 28 to which the branch should result if the condition is met.

In operation, the condition field 40 of the instruction word 37 output from the latch 30 controls the condition evaluation unit 36 to determine whether the condition is met. The condition evaluation unit 36 may be, for example, a 64-to-1 multiplexer having inputs coupled to the possible conditions. Some of the conditions input to the condition evaluation unit 36 would be, for example, the Carry Flag, the Parity Flag which is used for data communications, the Auxiliary Carry Flag which is used in BCD arithmetic, the Zero Flag which indicates whether an arithmetic operation has resulted in a value of zero, the Sign Flag which indicates a negative arithmetic result and the Overflow Flag which indicates an operation has generated a carry into the high-order bit of the result without generating a carry-out of the same bit. Other inputs to the condition evaluation unit 36 would be the Trap Flag, Interrupt-Enable Flag, Direction Flag and Virtual Mode Flag which direct processor operation. The condition evaluation unit 36 would have many other inputs in a normal microprocessor architecture.

Where a 64-to-1 multiplexer is used to implement the condition evaluation unit 36, the condition field 40 is input to the select port of the multiplexer, thereby passing one of the inputs to the inputs of the select port of the address multiplexer 32.

For purposes of illustration, it will be assumed that the mnemonic code for a conditional jump is CJUMPjJ, wherein program control will branch to address "J" if condition "j" is true. As can be seen in FIG. 2a, if a conditional jump instruction is output from microcode ROM 28 at instruction cycle t, then the conditional jump instruction will be output from latch 30 at instruction cycle t+1. At instruction cycle t+1, the address of the instruction sequentially following the conditional jump instruction will have already been output from the address multiplexer 32 and latched in latch 33. Thus, the next sequential instruction will be output from microcode ROM 28 whether or not the previous conditional jump branches. If condition j is true, address "J" will not be output to the microcode ROM 28 until instruction cycle t+2 and will not be output to the execution unit 18 until instruction cycle t+3. Consequently, the instruction sequentially after the conditional jump, will already be executed prior to the branch to address J.

FIG. 2c illustrates the typical programming technique for dealing with conditional jumps. If at address N there is an instruction CJUMPaA, the next instruction (at address N+1) is referred to as the "deadbox". The deadbox may contain a NOP instruction or, if possible, another instruction which will be useful whether or not the program control branches to address A on the next cycle. Address N+2 contains the instruction CJUMPbB and address N+4 contains the instruction CJUMPcC. Addresses N+3 and N+5 are deadboxes. Thus, the program will branch to address A if condition "a" is true, will branch to address B if condition "b" is true and condition "a" is false and will branch to address C if condition "c" is true and conditions "a" and "b" are false.

In a microcode routine, however, it is very common to check a large number of conditions with appropriate branching based on the conditions. As can be seen from FIG. 2c, each CJUMP command essentially takes two instruction cycles because of the deadboxes. This results in a large number of instruction cycles where useful instructions are not being performed.

FIG. 3a illustrates an instruction sequence wherein the deadboxes are removed. Hence, at address N of the microcode ROM 28, the instruction CJUMPaA is located, at address N+1, the instruction CJUMPbB is located and, at address N+2, the instruction CJUMPcC is located.

FIG. 3b is a table illustrating the consequences of the possible combinations of conditions "a", "b" and "c", along with the resulting sequence of program steps. For example, if conditions "a", "b" and "c" are all equal to "0" the sequence of instruction addresses is N, N+1, N+2, N+3, N+4, N+5. If condition "a" is equal to "1" and conditions "b" and "c" are equal to "0" then the order of instructions is N, N+1, A, A+1, A+2, A+3. If condition "a" equals "1" and condition "b" equal "1", then the order of instructions is N, N+1, A, B, B+1, B+2. Hence, a CJUMP instruction takes precedence over an immediately preceding CJUMP instruction. As can be seen, the program flow resulting from the various states of the conditions is extremely complex. Thus, while the program flow shown in FIG. 3a increases speed by removing the deadboxes, the complexity of the program sequence based on the possible conditions makes the programming costly and error-prone.

FIG. 4a illustrates a preferred embodiment of the sequencer 26 of the present invention which allows successive conditional jump instructions to be used without the resulting complexities demonstrated hereinabove. In addition to the circuitry shown in FIG. 2a, the circuit of FIG. 4a provides a latch 44 which stores the value output from the condition evaluation unit 36. The output of the latch 44 is connected to branch control circuitry 46 which is coupled to the control input of the condition evaluation unit 36 and to the output of latch 30.

Figure 4B:
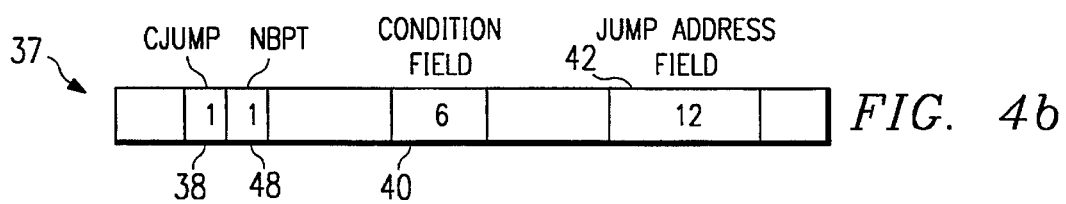
FIG. 4b illustrates an instruction word including a "no branch prior taken" field.

Additionally, a one-bit NBPT (no branch prior taken) field 48 is added to the instruction word 37 (see FIG. 4b). The NBPT field modifies a CJUMP command such that the branch will occur only if an immediately preceding conditional jump has not resulted in a branch. Thus, a CJUMP NBPT command will branch only if (1) the prior instruction was not a conditional jump (including a CJUMP NBPT) or (2) the preceding command was a conditional jump and branching did not occur because the condition was not met.

In operation, the circuitry shown in FIG. 4a works as follows. The output of condition evaluation unit 36 is stored in latch 44 on each instruction cycle. The branch control circuitry 46 evaluates the preceding output of the condition evaluation unit 36 (i.e., whether a branch occurred) and whether the NBPT bit is set in the instruction currently output from latch 30. If so, the condition field bits are set to "0" (or another predetermined value) which will result in the output of the condition evaluation unit 36 to set the address multiplexer 32 such that the program counter 34 is passed therethrough.

Referring again to FIG. 3a, if the NBPT bit is set for the CJUMPbB at address N+1 and for the CJUMPcC at address N+2, a more desirable result is obtained. At instruction cycle t, the CJUMPaA instruction is output from the microcode ROM 28. At instruction cycle t+1, the CJUMPaA instruction is at the output of latch 30 and the CJUMPbB NBPT instruction is at the output of microcode ROM 28. At instruction cycle t+2, the instruction at address A is output from the microcode ROM 28 (assuming condition "a" is met) and the CJUMPbB NBPT instruction is output from latch 30. Further, latch 44 outputs a value of "1" at instruction cycle t+2; hence, branch control circuitry 46 receives an NBPT signal of "1" a BT_LATCH signal (the output of latch 44) of "1" and the six bits of the condition field CF1–CF6. Because the previous command resulted in a branch (BT="1") and the NBPT bit of the instruction currently output from latch 30 is set to "1" the branch control circuitry 46 will output "0"s to the condition evaluation unit 36, thereby resulting in an output BT="0". Consequently, the address multiplexer 32 will pass the output of the program counter 34 to microcode ROM 28 resulting in an output of the instruction at address A+1 at instruction cycle t+3.

Thus, the circuit of FIG. 4a allows multiple conditional jumps to be placed in successive memory locations while allowing pipelining of the output of microcode ROM 28 without wasting instruction cycles due to the deadboxo If a preceding conditional jump results in a branch, a current CJUMP NBPT instruction will not branch, even if the condition is met.

Figure 5:
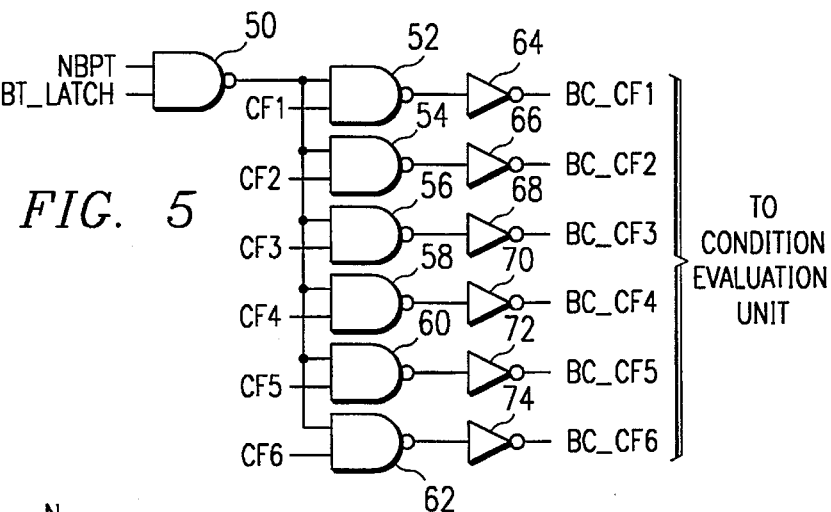

FIG. 5 illustrates a schematic diagram of the branch control circuitry 46. The value of the NBPT field 48 output from latch 30 and BT_LATCH from latch 44 are input to NAND gate 50. The output of NAND gate 50 is coupled to first inputs of NAND gates 52–62. The six bits of the condition field 40 are coupled to the second input of the respective NAND gates 52–62. The output of NAND gates 52–62 are coupled to respective inverters 64–74. The outputs of the inverters 64–74 are coupled to the condition evaluation unit 36.

If the NBPT bit and the BT_LATCH bit are set to "1" the output of NAND gate 50 will be set to "0". If the output of NAND gate 50 is set to "0", then the output of NAND gates 52–62 will all be set to "1" and the outputs of the respective inverters 64–74 will be set to "0".

Alternatively, if either the NBPT bit is set to "0" or the BT_LATCH bit is set to "0" then the output of NAND gate 50 will be set to "1" and the outputs of inverters 64–74 will be the same as the respective inputs CF1-CF6.

Figure 6:
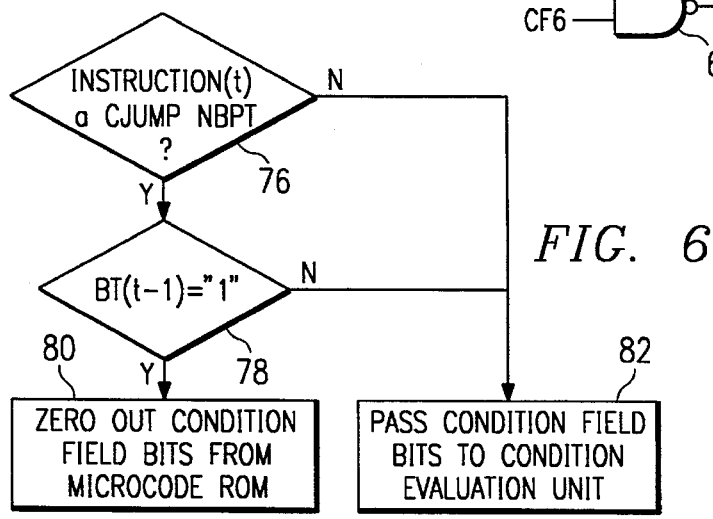
FIG. 6 illustrates a flow chart describing the operation of the branch control circuit of FIG. 5.

FIG. 6 illustrates a flow chart describing the operation of the CJUMPjJ NBPT instruction. In decision blocks 76 and 78, it is determined whether the current instruction has the NBPT bit set and whether the previous CJUMP instruction resulted in a branch. If both conditions are true, then a "0" is input to the condition evaluation unit 36 to force the address multiplexer 32 to pass the contents of the program counter 34 to the microcode ROM 28 (block 80). If either condition is not true, then the condition field bits CF1–CF6 will be passed to the condition evaluation unit 36 to evaluate whether a branch should occur (block 82).

This aspect of the present invention allows a microcode programmer to use a series of successive conditional jumps without resorting to the inefficiency of deadbox programming techniques.

In most cases, an unconditional jump (JUMP) will be a special case of the CJUMP command. In other words, an unconditional jump will have the CJUMP bit set to "1" and the condition field bits set to a predetermined value which will always result in a jump. Hence, the JUMP command also requires two instruction cycles for branching. A CALL command, however, does not require evaluation of a condition, and therefore may be implemented to branch on the next instruction cycle. In normal operation, the CALL command places the output of the program counter 34 onto a stack and branches to a subroutine located at the address indicated by the jump address field 42. At the end of the subroutine, the address is popped from the stack and program control continues at the address after the CALL instruction.

The sequencer implementation of FIG. 7a provides support for an enhanced CALL command which allows an IF-THEN-ELSE sequence to be efficiently performed. In FIG. 7a, the bits of the jump address field 42, as output from the microcode ROM 28, are input to the address multiplexer 32. To distinguish the jump address field bits output from the microcode ROM 28 (J_ADDR), the jump address field bits output from the microcode ROM 28 are labelled as the C_ADDR bits. A bit indicating that the instruction is a CALL instruction is input to call control circuitry 84. The BT output of the condition evaluation unit 36 is also coupled to the call control circuitry 84, as is the CJUMP bit output from the latch 30. The remaining parts of the sequencer 26 are the same as described in connection with FIG. 4a.

In operation, the call control circuitry 84 is effective when a CALL instruction is output from the microcode ROM 28. If so, the call control circuitry 84 checks the CJUMP bit output from latch 30 to determine whether the previous instruction was a conditional jump and determines whether branching occurred by checking the BT signal output from the conditional evaluation unit. If the previous instruction was a CJUMP instruction and branching did not occur, the call control circuitry 84 controls the address multiplexer 32 to pass the C_ADDR bits to the microcode ROM 28.

The operation of the call control circuitry 84 is described in conjunction with the flow chart of FIG. 7b. In decision block 86, the call control circuitry 84 determines whether the previous instruction, i.e., the instruction output from latch 30 is a conditional jump. If not, then the CALL command is processed normally—the current address information is pushed to a stack and the program control branches to the address indicated by C_ADDR (block 88). If the previous instruction was a conditional jump, the call control circuitry 84 determines whether the condition was met in decision block 90. If BT is not equal to "0" in decision block 90 (indicating that the condition was met), then the address multiplexer 32 will be controlled such that J_ADDR is passed to the microcode ROM 28 (block 92). If BT equals "0" (indicating that the condition was not met), then, in block 94, the address multiplexer 32 passes C_ADDR to the microcode ROM 28 without pushing the address information to the stack. Thus, in the event that the previous instruction was a conditional jump and the condition was not met, the CALL instruction operates as a one-cycle unconditional jump.

As shown in FIGS. 7c–d, the CJUMP command and CALL command can be combined to implement an IF-THEN-ELSE instruction. In FIG. 7c, the CJUMPaA instruction is followed by a CALLB instruction. If the CJUMPaA instruction is output from the microcode ROM 28 at instruction cycle t, then at instruction cycle t+2, program flow will either branch to address A, if the condition is met, or to address B, if the condition is not met, as shown in FIG. 7d.

This aspect of the invention provides for a two-instruction cycle IF-THEN-ELSE instruction.

Although the present invention and its advantages have been described in detail, it should be understood that various changes, substitutions and alterations can be made herein without departing from the spirit and scope of the invention as defined by the appended claims.

What is claimed is:

1. A microsequencer for sequencing microinstruction execution, including sequences of conditional jump (CJUMP) microinstructions (each defining a condition code field and a jump address field), the microsecquencer comprising:

a memory that stores microinstructions including CJUMP microinstructions, each CJUMP including a prior-branch field indicating that, if set, the CJUMP is immediately preceded by a CJUMP, and that if not set, the CJUMP is not immediately preceded by a CJUMP;

sequencer logic that sequences microinstructions output from the memory;

branch-prior-taken detection circuitry that, for a current CJUMP, detects a branch-prior-taken condition if (i) the current CJUMP output from the memory has its prior-branch field set indicating that a preceding microinstruction was a preceding CJUMP and (ii) the condition represented by the condition code of such preceding CJUMP was met indicating that such preceding CJUMP was taken; and branch inhibit circuitry that, for the current CJUMP, is responsive to the detection of a branch-prior-taken condition to inhibit such current CJUMP from causing a branch;

such that the sequencer logic causes a next microinstruction output from the memory after the current CJUMP to be determined by the jump address of such preceding CJUMP.

2. The microsequencer of claim 1 wherein said memory comprises a read-only memory.

3. The microsequencer of claim 1, wherein the branch inhibit circuitry comprises:

branch-prior-taken circuitry that, for the current CJUMP, is responsive to the detection of a branch-prior-taken condition to provide a branch-prior-taken signal; and branch control circuitry that, responsive to the branch-prior-taken signal indicates that such current CJUMP is not taken regardless of whether the condition represented by its associated condition code is met.

4. A method for sequencing microinstruction execution, including sequences of conditional jump (CJUMP) microinstructions (each defining a condition code field and a jump address field), the method comprising the steps of:

storing in a memory microinstructions including CJUMP microinstructions, each CJUMP including a prior-branch field indicating that, if set, the CJUMP is immediately preceded by a CJUMP, and that if not set, the CJUMP is not immediately preceded by a CJUMP;

outputting microinstructions from the memory according to a selected sequence;

detecting for a current CJUMP, a branch-prior-taken condition if (i) the current CJUMP output from the memory has its prior-branch field set indicating that a preceding microinstruction was a preceding CJUMP, and (ii) the condition represented by the condition code of such preceding CJUMP was met indicating that such preceding CJUMP was taken; and for the current CJUMP, responsive to the detection of a branch-prior-taken condition, inhibiting such current CJUMP from causing a branch, thereby outputting from the memory as a next microinstruction after the current CJUMP a microinstruction determined by the jump address of such preceding CJUMP.

5. The method of claim 4, wherein the step of branch inhibiting comprises the steps:

in response to a branch-prior-taken condition, generating, for the current CJUMP, a branch-prior-taken signal; and responsive to the branch-prior-taken signal, indicates that such current CJUMP is not taken regardless of whether the condition represented by its associated condition code is met, thereby outputting from the memory as the next microinstruction after the current CJUMP a microinstruction determined by the jump address of such preceding CJUMP.

6. A microsequencer for sequencing microinstruction execution, including sequences of conditional jump (CJUMP) microinstructions (each defining a condition code field and a jump address field), the microsequencer comprising:

a memory that stores microinstructions including CJUMP microinstructions, each CJUMP including a prior-branch field indicating that, if set, the CJUMP is immediately preceded by a CJUMP, and that if not set, the CJUMP is not immediately preceded by a CJUMP;

sequencer means for sequencing microinstructions output from the memory;

branch control means for detecting, for a current CJUMP, a branch-prior-taken condition if (i) the current CJUMP output from the memory has its prior-branch field set indicating that a preceding microinstruction was a preceding CJUMP, and (ii) the condition represented by the condition code of such preceding CJUMP was met indicating that such preceding CJUMP was taken; and branch inhibit means, responsive to the detection of a branch-prior-taken condition associated with the current CJUMP, for inhibiting a branch;

such that a next microinstruction output from the memory after the current CJUMP is determined by the jump address of such preceding CJUMP.

7. The microsequencer of claim 6, wherein the branch inhibit means comprises:

branch-prior-taken means, responsive to the detection of a branch-prior-taken condition for providing, for the current CJUMP, a branch-prior-taken signal; and branch control means, responsive to the branch-prior-taken signal, for indicating that such current CJUMP is not taken regardless of whether the condition represented by its associated condition code is met.

* * * * *